Dec. 4, 1928.

A. E. BIENSTOCK 1,693,974

ATTACHMENT FOR COOKING UTENSILS

Filed May 20, 1927

INVENTOR
ANNA E. BIENSTOCK
BY
ATTORNEYS

Patented Dec. 4, 1928.

1,693,974

UNITED STATES PATENT OFFICE.

ANNA E. BIENSTOCK, OF NEWARK, NEW JERSEY.

ATTACHMENT FOR COOKING UTENSILS.

Application filed May 20, 1927. Serial No. 192,845.

The invention relates to the art of cooking food stuffs and more particularly to the preparation of liquid food stuffs, such as soups and the like. In many instances, and especially in the preparation of clear soups, the ingredients utilized in the preparation of the soup are suspended in the cooking utensil so as to yield their extracts in the process of cooking without becoming actively mixed with the soup itself. In practice up to the present time it has accordingly been the custom to place vegetables or other ingredients in a fabric bag or its equivalent which is suspended in the cooking utensil during the cooking process so as to be submerged in water or other liquid contained in said utensil.

The object of the present invention is to provide simple and novel devices whereby such fabric bags may be efficiently suspended in the pot in which the soup or its equivalent is being made. The invention contemplates further the provision of a novel container for the ingredients, in combination with a novel means for suspending the same in the cooking utensil. Other objects will appear from the description hereinafter and the features of novelty will be pointed out in the claims.

Figure 1:
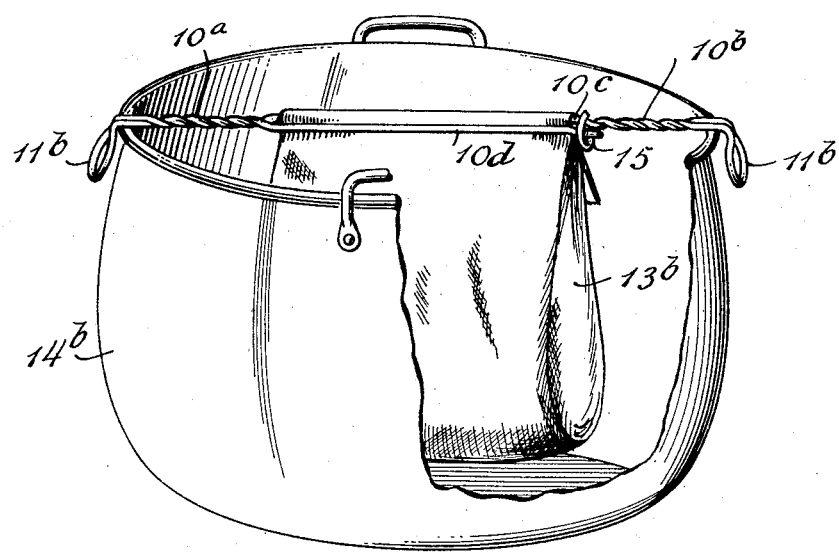
Figure 2:
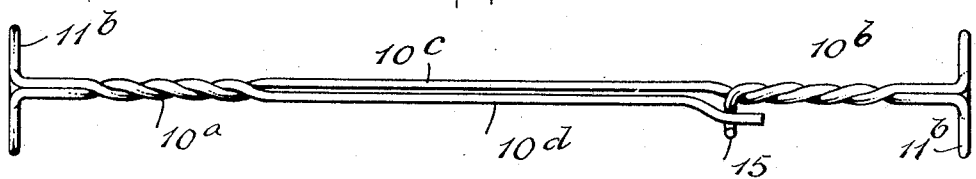

In the accompanying drawings which illustrate an example of the invention without defining its limits, Fig. 1 is a perspective view partly broken away showing the novel suspending device in use; and Fig. 2 is a detail plan view of the device itself.

In the form shown in Figs. 1 and 2, the suspending device is constructed of a single continuous length of wire twisted upon itself as indicated at $10^a$ and $10^b$, to form suspending members $11^b$ and clamping members $10^c$ and $10^d$, as shown in Fig. 2. The clamping member $10^d$ terminates in a free end and is movable relatively to the clamping member $10^c$ to facilitate the use of the device; a hook or equivalent means 15 is provided on the clamping member $10^c$ as an integral part thereof for maintaining the clamping member $10^c$ in its operative clamping position as shown in Figs. 1 and 2. In utilizing the device, a bag $13^b$ similar to the bag 13 is inserted at its open end between the clamping members $10^c$ and $10^d$ after which the clamping member $10^d$ is snapped beneath the hook 15 as indicated in Fig. 1. The clamping means $10^c$ and $10^d$ being constructed of wire and having an inherent elasticity, serve in this operative position to exert a clamping action upon the bag $13^b$ whereby the latter is securely connected with the suspending device which in addition to its other functions serves to close the open end of the bag $13^b$. When using the device, the suspending members $11^b$ are engaged with the upper edge of the cooking utensil $14^b$ so as to suspend the bag $13^b$ therein in the manner indicated in Fig. 1. The illustrated form, which may be said to be the preferred construction, is simple in construction and reliable in action and may be produced at a minimum cost.

In all forms of the invention, the ingredients, used in the preparation of the soup, will be efficiently suspended in the cooking utensil in a manner to be susceptible to the cooking operation without becoming actually mixed with the soup or its equivalent, which, accordingly, in its finished state, comprises a clear liquid, free from any particles of said ingredients. Straining of the soup or its equivalent subsequently to the completion thereof is thus entirely avoided. The ingredients are easily removed from the soup or its equivalent at will by simply lifting the device 10 or $10^a$ with the bag $13^b$ from the utensil 14, $14^b$ or $14^a$. The construction provides a simple and efficient medium for handling the ingredients easily and rapidly, as may be necessary. The devices are constructed in standard sizes and the suspending members $11^b$ are located and dimensioned so as to be adapted for cooking utensils of different dimensions within a fairly wide range.

The bag $13^b$ may easily be filled and emptied by simply detaching it from the device 10 or $10^a$.

Various changes in the specific forms shown and described may be made within the scope of the claims without departing from the spirit of the invention.

I claim:

1. A suspending device of the kind described, comprising parallel clamping members connected at one end, one of said members being continued in the form of suspending devices arranged to engage and rest upon the upper edge of a cooking utensil, and a hook adapted to engage the other clamping member to maintain the same in its operative position.

2. A suspending device of the kind described, comprising a continuous length of wire twisted upon itself to form a clamping member and suspending device at opposite ends thereof and a second clamping member terminating in a free end, and a hook comprising an integral part of said first named clamping member and adapted to receive the free end of the second clamping member for maintaining the latter in its operative clamping position.

In testimony whereof I have hereunto set my hand.

ANNA E. BIENSTOCK.